United States Patent
Berglund et al.

(10) Patent No.: US 7,346,438 B2
(45) Date of Patent: Mar. 18, 2008

(54) METHOD AND SYSTEM FOR IMPROVED AUTOMATIC CONTROL OF ONE OR SEVERAL FUNCTIONS IN A VEHICLE

(75) Inventors: Sixten Berglund, Torslanda (SE); Anders Eriksson, Göteborg (SE); Marcus Steen, Angered (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 11/307,281

(22) Filed: Jan. 30, 2006

(65) Prior Publication Data

US 2006/0276951 A1 Dec. 7, 2006

Related U.S. Application Data

(63) Continuation of application No. PCT/SE2004/000882, filed on Jun. 7, 2004, now abandoned.

(30) Foreign Application Priority Data

Jul. 30, 2003 (SE) .................................... 0302147

(51) Int. Cl.
*B60K 31/00* (2006.01)
(52) U.S. Cl. ........................................ 701/23; 340/903
(58) Field of Classification Search .................. 701/23, 701/51, 53, 55, 57, 58, 59, 60, 200, 65; 73/178 R; 340/903, 905, 988; 180/170
See application file for complete search history.

(56) References Cited

U.S. PATENT DOCUMENTS

| 5,716,301 | A | * | 2/1998 | Wild et al. | 477/97 |
| 5,832,400 | A | * | 11/1998 | Takahashi et al. | 701/53 |
| 5,911,771 | A | | 6/1999 | Reichart et al. | |
| 6,161,072 | A | * | 12/2000 | Clapper | 701/93 |
| 6,516,261 | B2 | * | 2/2003 | Ohashi et al. | 701/51 |
| 7,146,264 | B2 | * | 12/2006 | Bates et al. | 701/59 |

* cited by examiner

*Primary Examiner*—Dalena Tran
(74) *Attorney, Agent, or Firm*—Novak Druce + Quigg, LLP

(57) ABSTRACT

Method for improved automatic control of a function in a terrestrial vehicle that includes an automatic control of the function, determination of the position of the vehicle on the ground (x, y) and comparison of the position of the vehicle with one or several previously stored positions. The previously stored positions are positions in which it has been determined that the control automation has carried out a control that was outside a predetermined permitted range on previous occasions, and if the determined position of the vehicle conforms with one of the previously stored positions, special previously stored control information is used to reduce the risk of the control being outside the predetermined permitted range yet again. The invention can also include evaluation of the automatic control of one or several functions in the vehicle, and storage of positions (x, y) on the ground at which the evaluation has shown that the automatic control has carried out a measure that was outside the predetermined permitted range.

23 Claims, 3 Drawing Sheets

| Function "X" | | | |
|---|---|---|---|
| Coordinates (x, y) | Warning point (x, y) | End point (x, y) | Control-$\Delta$ |
|  |  |  |  |
|  |  |  |  |
|  |  |  |  |
|  |  |  |  |

FIG. 4

METHOD AND SYSTEM FOR IMPROVED AUTOMATIC CONTROL OF ONE OR SEVERAL FUNCTIONS IN A VEHICLE

CROSS-REFERENCE TO RELATED APPLICATIONS

The present application is a continuation patent application of International Application No. PCT/SE2004/000882 filed 7 Jun. 2004 now abandoned which is published in English pursuant to Article 21(2) of the Patent Cooperation Treaty, and which claims priority to Swedish Application No. 0302147-4 filed 30 Jul. 2003. Said applications are expressly incorporated herein by reference in their entireties.

TECHNICAL FIELD

The present invention relates to a method and a system for improved automatic control of one or several functions in a vehicle. The invention is primarily intended for vehicles that have a great deal of automation for controlling different functions in the vehicle, in particular for the drive line in the vehicle.

The invention also relates to a computer program and computer program product for causing a computer to carry out the method according to the invention.

BACKGROUND OF THE INVENTION

In many vehicles of different types it is becoming increasingly common to have automatic control of various functions in the vehicle. Examples of functions that are controlled by automation are the drive line, in other words the whole sequence from the chemical conversion of the fuel to propulsive force for one or several wheels, the braking system, the air-conditioning system, the maintenance system, and the chassis control system. Many other functions can nowadays also be controlled by automation.

Automatic control of the various functions makes the task of the driver easier, but there is always a possibility that automatic control of functions can lead to incorrect measures being taken, for example changing to a higher or lower gear than what is actually required, or connection/disconnection of a function. The fact that the automation carries out incorrect measures or connects/disconnects functions when this has not been required, is of course not desirable, as among other things it can lead to non-optimal operation of the vehicle and, last but not least, frustration in the driver due to the fact that the automation is not carrying out its tasks properly.

The frustration in the driver can been increased by the fact that lorries, for example, are often driven on one and the same route, which means that the driver learns to recognize the places where the automation tends to make mistakes.

SUMMARY OF INVENTION

There is thus a need to be able to improve or optimize the automatic control of one or several functions in the vehicle. It is a given requirement that such optimization is to be as simple and reliable as possible.

These needs and requirements are fulfilled by the present invention as it is characterized by a method for improved automatic control of one or several functions in a terrestrial vehicle and that includes automatic control of one or several functions in the vehicle, determination of the vehicle's position on the ground, and comparison of the vehicle's position with one or several previously stored positions.

According to the invention, the previously stored positions are positions where it has been determined that the control automation has carried out a control that was outside a predetermined permitted range on previous occasions, and if the determined position of the vehicle conforms with one of the previously stored positions, special previously stored control information is used to reduce the risk of the control being outside the predetermined permitted range yet again.

As the comparison of the position of the vehicle with one (or several) previously stored positions is used in order to be able to use the previously stored control information if the position of the vehicle conforms with one of the previously stored positions, it is possible for the automation to "recognize" places where the automation has made mistakes previously. This in turn makes it possible to ensure that the mistake is not repeated the next time the vehicle is in that place, or at least that the risk is reduced of the mistake being repeated the next time the vehicle is in a previously known position where a mistake has been made by the automation. The invention also suitably comprises evaluation of the automatic control of one or several functions in the vehicle, and storage of positions on the ground at which the evaluation has shown that the automatic control has carried out a measure that was outside said predetermined permitted range. This means that the system can be updated continuously with regard to "new" positions where a special control may be necessary.

The determination of the vehicle's coordinates can be carried out in a number of different ways, either by using external signal sources, for example GPS or another satellite navigation system. The determination of the vehicle's coordinates can, however, also be carried out by using calculation means that are internal in the vehicle.

The invention also relates to a system provided with different means for carrying out the method according to the invention.

BRIEF DESCRIPTION OF DRAWINGS

The invention will be described in greater detail in the following, with reference to the attached drawings, in which:

FIG. 4 is a table for a function according to the invention.

DETAILED DESCRIPTION

The invention will be described, by way of introduction, for a vehicle with an automatic gearbox. It should, however, be recognized that the principle according to the invention can be used for practically any automatically controlled function in a vehicle. Examples of such other functions will be given in the following description as well as be appreciated by those persons skilled in this art.

Figure 1:
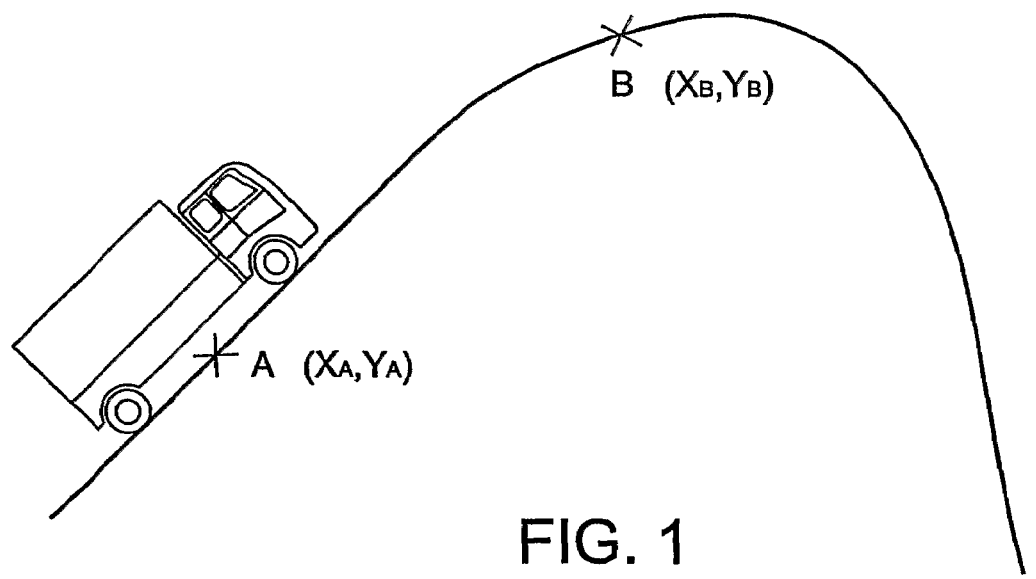
FIG. 1 and FIG. 2 are schematics showing two operational sequences in a vehicle with automatic control of the gearbox.

FIG. 1 schematically shows a vehicle (such as a lorry or truck) that is driving up a hill. The vehicle is equipped with an automatic gearbox which has caused the vehicle's gearbox to select a particular gear, for example 11th gear, at a point A on the uphill gradient, on the basis of various criteria such as, among other things, the resistance to forward motion, the throttle position and the overall weight.

At a point B that is located after point A, the gearbox automation determines that the vehicle is to change down to 10th gear, in response to the load on the vehicle's driveline. When the change down is carried out, however, the vehicle has just reached the top of the hill, which means that a short time after the change down (11th gear to 10th gear) has been carried out, the automation causes the gearbox to change back up to 11th gear. The change down that was carried out was thus unnecessary, which among other things will be noticed by the driver of the vehicle. The unnecessary gear change will also cause a deterioration in fuel economy and a lower average speed.

A possible way of avoiding incorrect control of functions that are controlled by automation is, for example, to provide the vehicle with a map database so that incorrect control can be avoided by the automation making use of the map data for controlling the vehicle. With the use of such a system, the unwanted change down in the example above would have been avoided, as the system would have read the height data from the database, and accordingly would have realized that the top of the hill was going to be reached shortly, and that the change down was unnecessary.

A disadvantage of such a solution is, however, that map databases are not available for all geographical areas. In addition, map databases with height data have certain disadvantages, such as, for example, that the fact that they do not have information about other important features, for example where traffic lanes merge or separate, the location of junctions, traffic lights, traffic-calming measures, recurring light and climate conditions and the like. A solution that is not dependent upon map databases is therefore preferable.

Figure 2:
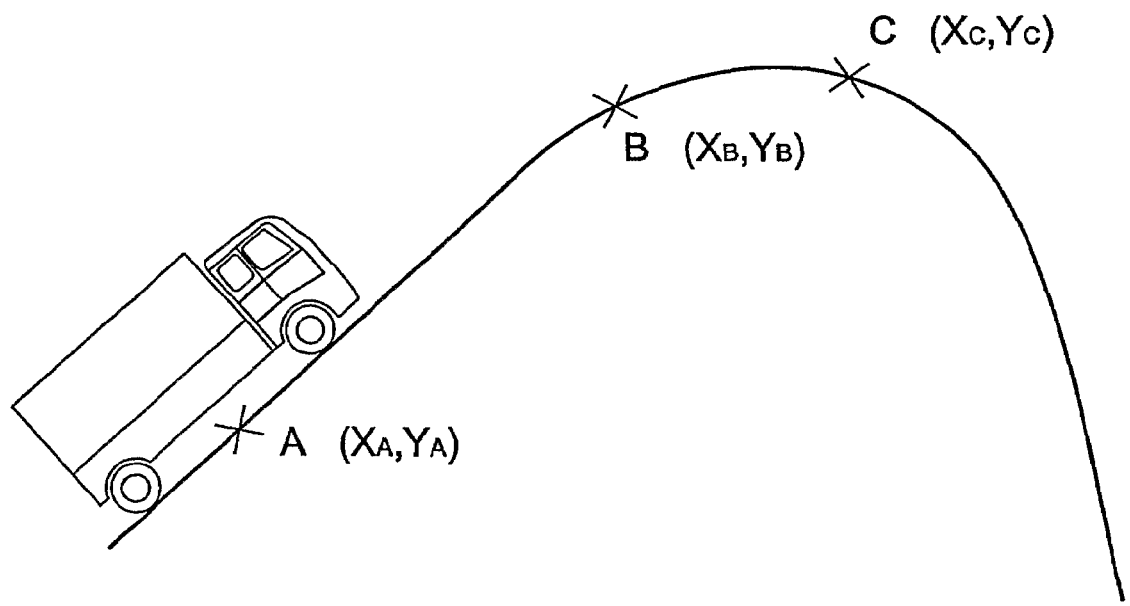
Figure 3:
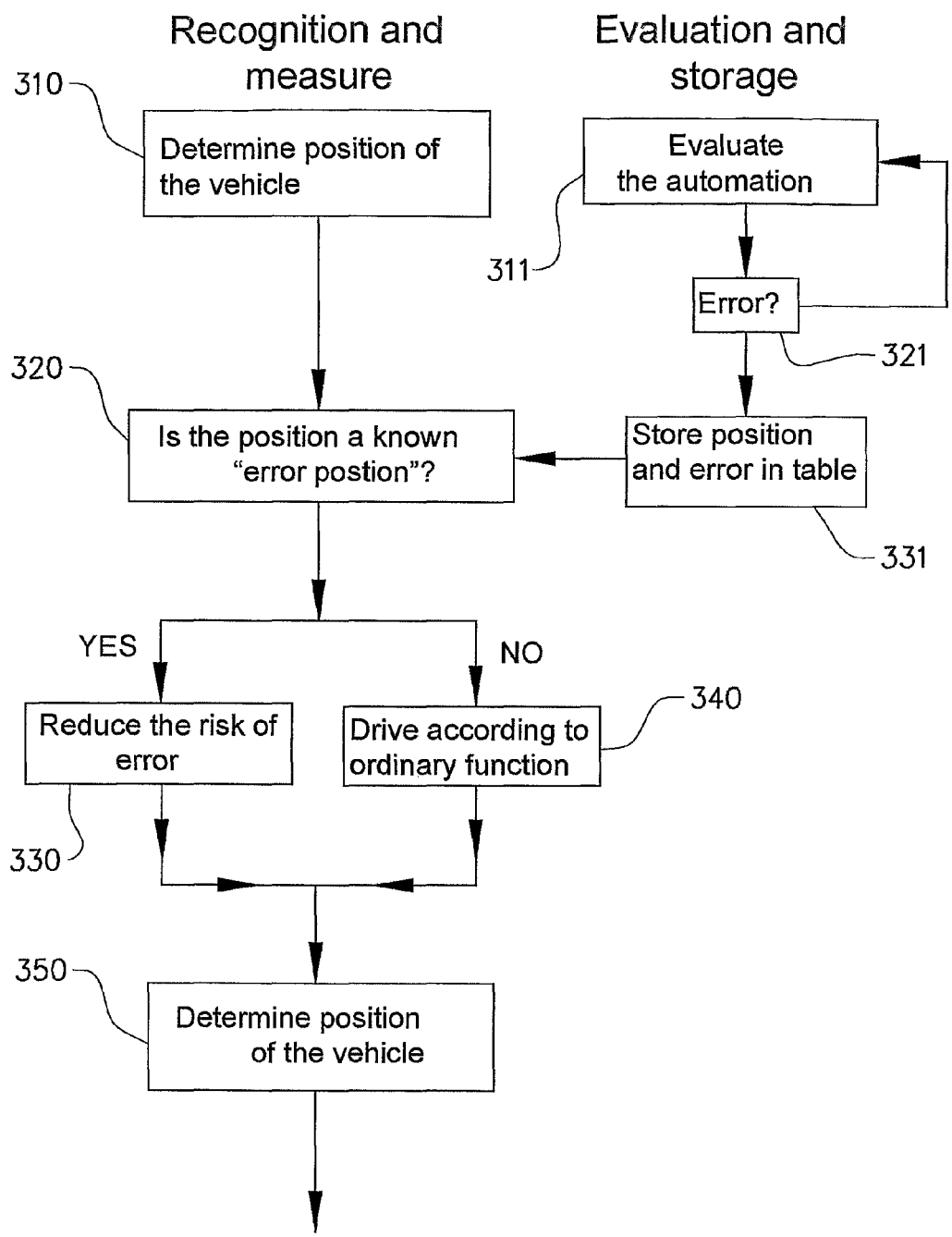
FIG. 3 is a simplified flow chart of a method performed according to the invention.

FIG. 2 shows a vehicle equipped with a system according to the present invention, the function of which will be described below, with reference to corresponding boxes in the simplified flow chart in FIG. 3.

In other words, FIG. 2 thus shows a system which succeeds in meeting the requirements that have been listed above, including the requirement of being independent of map databases.

The vehicle comprises control means (not shown explicitly) for automatic control of one or several functions in the vehicle, and comprises, in addition, a device (not shown) for determining the position (310) of the vehicle on the ground; in other words, the coordinates that are usually called x and y. The height coordinate z can, of course, be included in such a system, but is not central to the invention and will therefore not be described in greater detail.

The device or means for determining the position of the vehicle can be implemented in a large number of ways that will be known to experts in the field, but can include, for example, means for satellite navigation, for example GPS, and devices for inertia navigation. The control means can similarly be implemented in a large number of different ways, the precise details of which are not of central significance to the invention, but can suitably comprise a microprocessor or other type of computer unit.

The position of the vehicle on the ground is suitably determined continually while the vehicle is in motion by the means for this purpose, and the system in the vehicle comprises means for comparing (320) continually or at fixed intervals the vehicle's coordinates with coordinates that have been previously stored, for example in one or several tables.

The previously stored positions are positions where it has been ascertained that the control automation has carried out a control on previous occasions that was outside the predetermined permitted range, in other words that the control automation has made an error or a mistake.

The system according to the invention with which the vehicle is equipped comprises, in addition, means for carrying out the comparison (320) of the coordinates, and, if the position of the vehicle conforms to one of the previously stored positions, for reaching a decision (330) concerning whether the control system is to use special previously stored control information. This special control information suitably comprises information based on errors or mistakes that the control automation has made at the coordinates in question on previous occasions, so that the danger of the control being outside said predetermined permitted range yet again is reduced and, if possible, eliminated.

By means of the described arrangement according to the invention, the control automation can thus recognize places where the control automation has made errors or mistakes previously, and reduce the risk of repeating these errors or mistakes the next time that the vehicle reaches the same place.

The system according to the invention comprises, in addition, means for evaluating (311) the automatic control of one or several functions in the vehicle. This makes it possible to detect new errors or mistakes (321) while the vehicle is in motion, and to store the coordinates for these (331) so that they can be included in the positions that the system compares in order to avoid errors or mistakes.

It is suitably not just the coordinates for positions where errors or mistakes have been made that are stored, but also information about the type of mistake, in order to make it easier for the automation to reach a better decision the next time the vehicle reaches the same place.

Referring again to FIG. 1 and FIG. 2, it will now be described how the system according to the invention improves the control automation: the means for evaluating the control has determined (321) that a mistake has been made (changing down at point B) after the first time that the vehicle was at the coordinates in question, and has stored (331) the coordinates ($x_B$, $y_B$) on the ground for this, along with information for preventing the mistake. As the mistake in the present example was an unnecessary change down, the system according to the invention has stored control information which means that the vehicle adjusts the limits for when changing down is to be carried out the next time it reaches the coordinates ($x_B$, $y_B$) in question.

The fact that an incorrect control has been carried out is determined by the automation investigating whether certain parameters are within a permitted range. In the case of changing gear, an example of such a parameter can be the engine speed, or alternatively the distance over which the selected gear is to be retained, in other words the distance from the point B to the top of the hill. If this distance is shorter than a certain predetermined limit, the automation can be allowed to regard the change down as unnecessary, and therefore to enter the coordinates for the point B in a memory.

When the components comprised in the system and described above have thus determined that the vehicle is again at the point B (320), the control automation will adjust the limits that normally apply for when a change down is to take place (330). As it is not possible to be certain that the same conditions that applied when the incorrect change down was carried out will also apply when the vehicle returns to the same place, it is inappropriate to introduce a total prohibition on the automation changing down (the vehicle can be more heavily laden, the road surface can be slippery, there can be strong headwind and the like). In other words, at the point B the ordinary control automation for the gearbox is bypassed, and other rules that in this case are "more stringent" are applied, without however introducing a total prohibition on changing down. If, for example, the engine speed of the vehicle in combination with a particular time limit are the parameters used by the gearbox automation, the time, for example, for a certain engine speed limit can be extended at the point B, for example up to a point C when the vehicle is calculated to have passed the top of the hill.

The comparison of the position of the vehicle with "error positions" is suitably carried out by a number of tables with positions being stored in the system in the vehicle, suitably one table per function that is to be affected by the invention. Each table thus comprises information about "error positions" or positions where different limit values or control conditions to the "normal" are to apply.

In order to enable the automation to compensate for changes (such as, for example, different overall weight, wind speed, road surface conditions), it is also expedient, but not necessary, for the automation to obtain information about the positions at which the adjusted limit values or control conditions are to apply a certain distance before the actual position. With reference to the gearbox automation and the point A in FIG. 1 and in FIG. 2, this could be expressed in words as follows: "a hundred meters (for example) before the position where the gearbox automation has made a mistake on a previous occasion, the gearbox automation is to replace the normal control rules with other rules according to the table in order to avoid making the same mistake again."

Concerning the use of the special control information, it is possible for the automation to use it for a certain predetermined distance or time from the time when it is started to be used. Alternatively, coordinates can be stored in the system for when the normal control is to start to be used again.

It is also possible for the position comparison to be carried out with a certain degree of tolerance. The tolerance in question can be one and the same for all the positions in the system, or different per function, or different per function and position.

In order to make the invention clearer, FIG. 4 shows a table for use in a system according to the invention: one table per function is preferably used in a system according to the invention for the functions that have automatic control, but this can, of course, be carried out in another way within the framework of the invention. As has been described above, the table in FIG. 4 contains coordinates for the point at which the automation is to use other rules than the normal ones. In addition, the table can contain the coordinates, suitably set individually for each function-for a "warning point"; in other words, a point a certain distance before the point at which the automation is to use other rules than the normal ones, and the coordinates for an "end point", in other words a point at which the automation is to resume the normal function. The end point can also be expressed as an end time.

In addition to said coordinates, the table also contains data about the rules that are to apply at the point in question. These rules can be many different kinds, for example a prohibition on carrying out a certain control or compulsion to carry out a certain control, or stricter or less strict limits for when a certain control is to be implemented. If the limits are to be stricter or less strict, the table suitably contains information about how much stricter or less strict the limits are to be, which is, as shown in the table in FIG. 4, given as a "Δ-value", which can be either positive or negative.

The invention has been described above primarily by means of an example that illustrates the invention applied to gearbox automation, but it should be recognized that the invention can be applied in principle to any automatic control in a vehicle. Other examples of possible controls that can use the invention are air-conditioning automation and other types of environment-optimizing controls.

The invention is primarily intended for terrestrial vehicles, and primarily vehicles that are road-going; in other words, wheeled vehicles.

What is claimed is:

1. A method for improved automatic control of at least one function in a terrestrial vehicle, said method comprising:
   determining (310) the position (x, y) of the vehicle with respect the ground; and
   performing an evaluation by comparing (320) the position (x, y) of the vehicle with a previously stored position, wherein the previously stored position is a position at which it has been determined (321) that the automatic control has carried out a control that was outside a predetermined permitted range on a previous occasion, and in the event that the determined position of the vehicle conforms with the previously stored position, special previously stored control information is used (340) in a single step to reduce the risk of the control being again outside said predetermined permitted range.

2. The method as recited in claim 1, further comprising:
   evaluating (311) the automatic control of at least one function in the vehicle; and
   storing (331) positions (x, y) with respect to the ground at which the evaluation has shown that the automatic control has carried out a measure that was outside said predetermined permitted range.

3. The method as recited in claim 1, wherein the previously stored position with which comparison of the position (x, y) of the vehicle is made comprises the position at which the evaluation has shown that the automatic control has carried out a measure that was outside said predetermined permitted range.

4. The method as recited in claim 1, wherein the comparison of the position of the vehicle with the previously stored position is carried out with a predetermined tolerance so that the special control information is utilized before the precise previous position has been reached.

5. The method as recited in claim 1, wherein the special control information is utilized for one of (i) a predetermined distance and (ii) a predetermined time period before and after the previously stored position has been reached.

6. The method as recited in claim 1, wherein the determination of the position (310) of the vehicle on the ground is carried out by using an external signal source.

7. The method as recited in claim 1, wherein the determination (310) of the position of the vehicle on the ground is carried out by using calculation means in the vehicle.

8. The method as recited in claim 1, wherein the previously stored position is stored in tables, with one table per function for the functions that are controlled by the automatic control.

9. The method as recited in claim 1, wherein the at least one function is a driveline control.

10. The method as recited in claim 1, wherein said method is carried out on a computer program comprising program code and said program is executed by a computer.

11. The method as recited in claim 1, wherein said method is embodied in a computer program product comprising program code, stored on a medium that can be read by a computer, for carrying out all the steps of said method when said computer program is executed by a computer.

12. The method as recited in claim 1, wherein said method is embodied in a computer program product that can be loaded directly into an internal memory in a digital computer, comprising a computer program for carrying out all the steps of said method when said computer program is executed by a computer.

13. A system for improved automatic control of at least one function in a vehicle, said system comprising:
control means for automatically controlling at least one function in a vehicle;
position determination means for determining the position (x, y) of the vehicle with respect to the ground;
comparison means for comparing the position of the vehicle with a previously stored position in the system, wherein the previously stored position is a position at which the automatic control has carried out a control that was outside a predetermined permitted range on previous occasions; and
decision-making means for evaluating the position comparison, which decision-making means determines that the control means is to utilize special previously stored control information in a single step when the position of the vehicle conforms with the previously stored position.

14. The system as recited in claim 13, further comprising:
evaluation means for evaluating the automatic control of the at least one function in the vehicle; and
storage means for storing positions (x, y) with respect to the ground at which the evaluation means determines that the automatic control has carried out a measure that was outside a predetermined permitted range.

15. The system as recited in claim 14, wherein the storage means adds the stored positions to the positions utilized by the comparison means.

16. The system as recited in claim 14, wherein the storage means stores the positions in tables, with one function per table for the functions that are controlled by the automatic control.

17. The system as recited in claim 13, wherein the comparison means utilizes a predetermined tolerance in the position comparison so that the decision-making means can bring into play the special control information or prepare the special control information for use before the precise position has been reached.

18. The system as recited in claim 13, wherein the decision-making means is arranged to ensure that the special control information is used for one of (i) a predetermined distance and (ii) a predetermined time period from when it starts to be used.

19. The system as recited in claim 13, wherein the position determination means comprises means for communication with an external signal source, and the position determination means uses the signal source to determine the position of the vehicle on the ground (x, y).

20. The system as recited in claim 13, wherein the position determination means is internal to the vehicle and comprises calculation means by which the position (x, y) of the vehicle on the ground is determined.

21. The system as recited in claim 13, wherein the system is for automatic control of a driveline of the vehicle.

22. A method for improved automatic control of one or several functions in a terrestrial vehicle, said method comprising the following:
automatic control of one or several functions in the vehicle;
determination (310) of the position of the vehicle on the ground (x, y); and
comparison (320) of the position of the vehicle with one or several previously stored positions, characterized in that the previously stored positions are positions where it has been determined (321) that the control automation has carried out a control that was outside a predetermined permitted range on previous occasions and if the determined position of the vehicle conforms with one of the previously stored positions, special previously stored control information is used (340) in a single step to reduce the risk of the control being outside said predetermined permitted range yet again.

23. A system for improved automatic control of one or several functions in a vehicle, said system comprising:
control means for automatic control of one or several functions in the vehicle;
position determination means for determination of the position of the vehicle on the ground (x, y);
comparison means for comparison of the position of the vehicle with one or several positions that have been previously stored in the system, and wherein the previously stored positions are positions where the control automation has carried out a control that was outside a predetermined permitted range on previous occasions, and in that the system comprises decision-making means for evaluating the position comparison, which decision-making means determines that the control means is to use special previously stored control information in a single step if the position of the vehicle conforms with one of the previously stored positions.

* * * * *